United States Patent
Peng et al.

(10) Patent No.: US 11,100,901 B2
(45) Date of Patent: Aug. 24, 2021

(54) METHOD FOR CONTROLLING RENDERING OF LAYERS, TERMINAL, AND STORAGE MEDIUM

(71) Applicant: Guangdong Oppo Mobile Telecommunications Corp., Ltd., Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/566,000

(22) Filed: Sep. 10, 2019

(65) Prior Publication Data
US 2020/0005736 A1    Jan. 2, 2020

Related U.S. Application Data

(63) Continuation of application No. PCT/CN2018/078564, filed on Mar. 9, 2018.

(30) Foreign Application Priority Data

Mar. 10, 2017    (CN) .......................... 201710142488.5

(51) Int. Cl.
*G09G 5/377*    (2006.01)
*G06F 9/451*    (2018.01)

(52) U.S. Cl.
CPC .............. *G09G 5/377* (2013.01); *G06F 9/451* (2018.02); *G09G 2320/0626* (2013.01); *G09G 2340/0407* (2013.01); *G09G 2340/125* (2013.01)

(58) Field of Classification Search
None
See application file for complete search history.

(56) References Cited

U.S. PATENT DOCUMENTS 10,062,181 B1 *   8/2018   Longhurst ............... G06T 15/04
2016/0057373 A1 * 2/2016   Adams ................. H04N 19/177
                                                          348/723
(Continued)

FOREIGN PATENT DOCUMENTS

CN        102156999 A      8/2011
CN        104731543 A      6/2015
(Continued)

OTHER PUBLICATIONS

International search report issued in corresponding international application No. PCT/CN2018/078564 dated Jun. 11, 2018.
(Continued)

*Primary Examiner* — Yi Wang
(74) *Attorney, Agent, or Firm* — Young Basile Hanlon & MacFarlane, P.C.

(57) ABSTRACT

Provided are a method and apparatus for controlling rendering of layers, and a terminal. The method includes the following. Layer attribute information of a current layer rendered by an application is obtained, where the current layer has a specified type. A target frame rate of rendering is determined according to the layer attribute information of the current layer. The application is controlled to render, according to the target frame rate of rendering, a layer to-be-rendered of the specified type.

11 Claims, 5 Drawing Sheets

---

101 — Obtaining layer attribute information of a current layer rendered by an application, where the current layer has a specified type 102 — Determining a target frame rate of rendering according to the layer attribute information of the current layer 103 — Controlling the application to render, according to the target frame rate of rendering, a layer to-be-rendered of the specified type

(56) References Cited

U.S. PATENT DOCUMENTS

| | | | | |
|---|---|---|---|---|
| 2016/0286155 A1* | 9/2016 | Bhuvanagiri | ........ | H04N 7/0122 |
| 2017/0092340 A1* | 3/2017 | Zheng | .................. | G11C 7/1072 |
| 2017/0200315 A1* | 7/2017 | Lockhart | .............. | H04N 13/344 |

FOREIGN PATENT DOCUMENTS

| | | | |
|---|---|---|---|
| CN | 104822077 | A | 8/2015 |
| CN | 105338410 | A | 2/2016 |
| CN | 105739670 | A | 7/2016 |
| CN | 106027942 | A | 10/2016 |
| CN | 106210853 | A | 12/2016 |
| CN | 106327540 | A | 1/2017 |
| GB | 2507482 | A | 5/2014 |
| WO | 2012058936 | A1 | 5/2012 |

OTHER PUBLICATIONS

First examination report issued in corresponding IN application No. 201917037609 dated May 29, 2021.

\* cited by examiner

METHOD FOR CONTROLLING RENDERING OF LAYERS, TERMINAL, AND STORAGE MEDIUM

CROSS-REFERENCE TO RELATED APPLICATION(S)

This application is a continuation of International Application No. PCT/CN2018/078564, filed on Mar. 9, 2018, which claims priority to Chinese Patent Application No. 201710142488.5, filed on Mar. 10, 2017, the disclosures of both of which are hereby incorporated by reference in their entireties.

TECHNICAL FIELD

This disclosure relates to the field of display technologies, and more particularly to a method for controlling rendering of layers, a terminal, and a storage medium.

BACKGROUND

At present, a size of a display screen of a terminal is getting increasingly larger, and applications installed and functions thereof are more and more diversified. A user may spend a lot of time every day using the terminal. Therefore, display efficiency and power consumption of the terminal have become important indicators for measuring the performance of the terminal.

Pictures on the terminal are usually displayed per frame basis, and each displayed picture often contains multiple layers. A process of generating to displaying a displayed picture is as follows. After an application renders multiple layers, the multiple layers rendered are synthesized by a layer synthesis module into the display picture to-be-displayed. Thereafter, the display picture to-be-displayed is sent to the display screen for display. In the above process, time needed and resources consumed are affected by various factors, which may further affect display efficiency and power consumption of the terminal.

SUMMARY

In implementations of the disclosure, a method for controlling rendering of layers, a terminal, and a storage medium are provided.

According to a first aspect of the disclosure, a method for controlling rendering of layers is provided. The method includes the following. Layer attribute information of a current layer rendered by an application is obtained, where the current layer has a specified type. A target frame rate of rendering is determined according to the layer attribute information of the current layer. The application is controlled to render, according to the target frame rate of rendering, a layer to-be-rendered of the specified type.

According to a second aspect of the disclosure, a terminal is provided. The terminal includes a memory and a processor. The memory is configured to store computer programs. The computer programs, when executed, are operable with the processor to: obtain layer attribute information of a current layer of a specified type rendered by an application; determine a target frame rate of rendering according to the layer attribute information of the current layer; control the application to render, according to the target frame rate of rendering, a layer to-be-rendered of the specified type.

According to a third aspect of the disclosure, a non-transitory computer readable storage medium is provided.

The non-transitory computer readable storage medium is configured to store executable instructions which, when executed, are operable with a processor to: obtain layer attribute information of a current layer rendered by an application, wherein the current layer has a specified type; determine a target frame rate of rendering according to the layer attribute information of the current layer when the layer attribute information of the current layer satisfies the predetermined condition; control the application to render, according to the target frame rate of rendering, a layer to-be-rendered of the specified type.

BRIEF DESCRIPTION OF THE RENDERINGS

DETAILED DESCRIPTION

Figure 1:
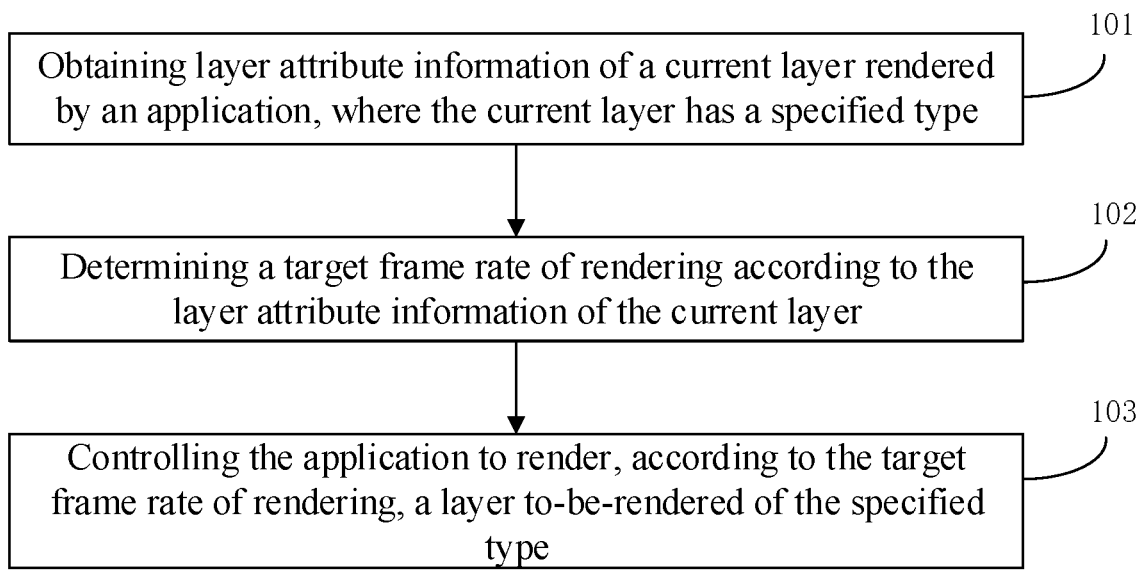
FIG. 1 is a schematic flowchart illustrating a method for controlling rendering of layers according to an implementation of the disclosure.
Figure 2:
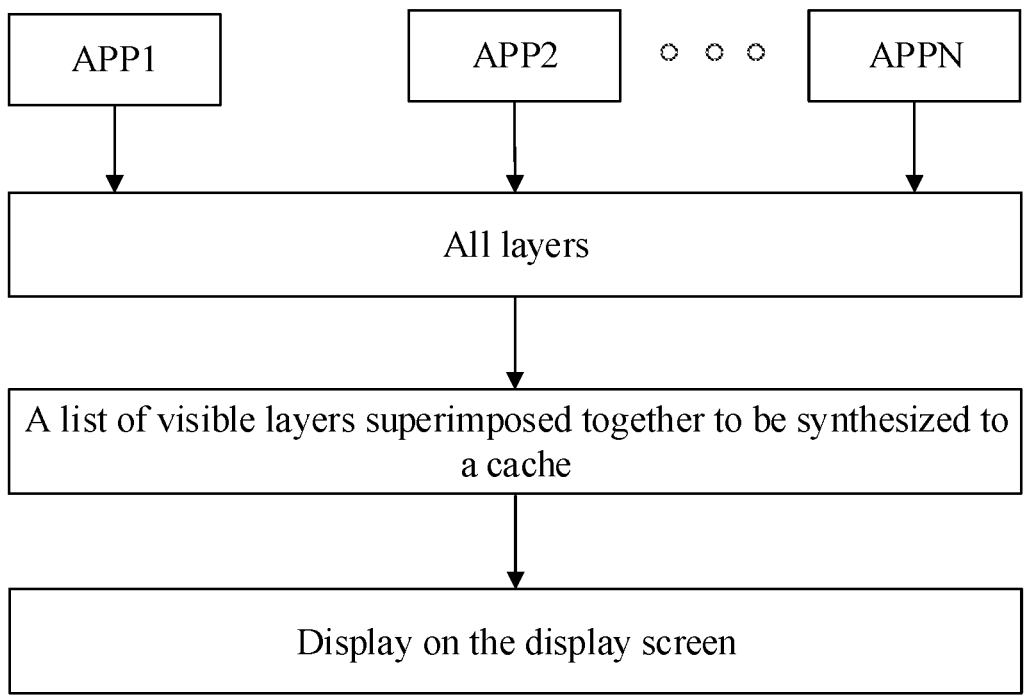
FIG. 2 is a schematic diagram illustrating a display process according to an implementation of the disclosure.

Technical solutions of the disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the disclosure are illustrated in the accompanying drawings.

Before discussing the exemplary implementations in more detail, it should be mentioned that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

A method for controlling rendering of layers is provided. The method includes the following. Layer attribute information of a current layer rendered by an application is obtained, where the current layer has a specified type. A target frame rate of rendering is determined according to the layer attribute information of the current layer. The application is controlled to render, according to the target frame rate of rendering, a layer to-be-rendered of the specified type. This method will be depicted in detail with reference to the accompany drawings in the following.

FIG. 1 is a schematic flowchart illustrating a method for controlling rendering of layers according to an implementation of the disclosure. The method can be implemented by an apparatus for controlling rendering of layers. The apparatus can be implemented by software and/or hardware and can generally be integrated into a terminal. As illustrated in FIG. 1, the method begins at block 101.

At block 101, layer attribute information of a current layer rendered by an application is obtained, where the current layer has a specified type.

In one example, the terminal of the disclosure may be a device containing a display screen, such as a mobile phone, a smart watch, a tablet computer, a game machine, a personal digital assistant, and a digital multimedia player.

In one example, pictures are usually displayed per frame basis, and each displayed picture often contains multiple layers. After multiple layers are rendered by an application, the multiple layers can be received by a related module configured for layer synthesis.

The disclosure is not limited to an operating system loaded in the terminal, such as an Android® system, a Windows® Phone (WP) operating system, an Apple® IOS system, or the like. For illustrative purposes, the following takes an Android system as an example.

At an application layer, each application program (hereinafter referred to as application or APP) may include one or more layers rendered. Each of multiple applications, such as APP1, APP2 . . . APPN, carries out respective drawing operation (that is, each of the multiple applications renders an image(s) on the one or more layers) according to its own application design (usually decided by a corresponding installation package (referred to as APK in Android system)). After the drawing operation is completed, each application sends all rendered layers to a layer synthesis module (for example, surface flinger) for layer synthesis.

At an application framework layer, all layers (visible and invisible layers) form a list of layers, which is defined as ListAll. The layer synthesis module selects, from the ListAll, the visible layers to form a list of visible layers, which is defined as DisplayList. Thereafter, the layer synthesis module searches for an idle frame buffer (FB) from three reusable FBs in the system, and superimposes the visible layers in the DisplayList together in the idle FB through a synthesis operation according to application configuration information, so as to obtain a final picture to-be-displayed. The application configuration information may be, for example, which layer should be set at the bottom, which layer should be set at the top, which region should be visible, which region should be transparent, and so on.

At last, at a Kernel layer, the picture to-be-displayed may be transmitted to a display component (including a display controller and a display screen) to be displayed on the display screen. There is no restriction on the type of the display screen. For example, the display screen may be a liquid crystal display (LCD).

Figure 3:
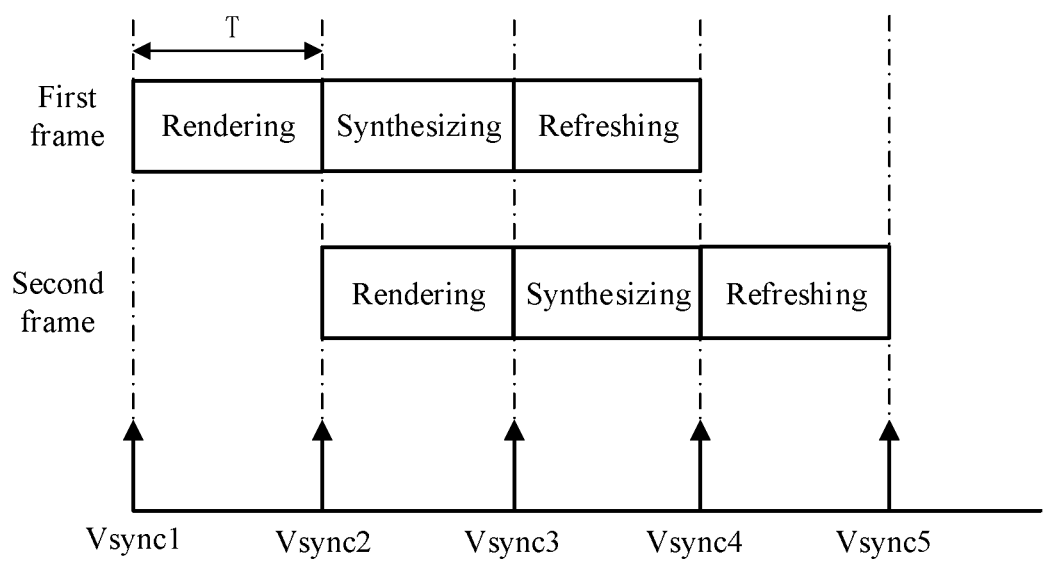
FIG. 3 is a schematic diagram illustrating a Vsync display refreshing mechanism according to an implementation of the disclosure.

In addition, in terms of display refreshing, the Android system introduces a synchronous refreshing mechanism. FIG. 3 is a schematic diagram illustrating a Vsync display refreshing mechanism according to an implementation of the disclosure. The Vsync display refreshing mechanism refers to that in the whole display process, a "heartbeat", i.e., a system vertical synchronization (Vsync) signal, is introduced and sent by the display controller to the CPU for generating a Vsync interrupt, such that each layer rendering operation and each layer synthesis operation can be performed according to the "heartbeat", and therefore key operations in the whole display process are incorporated into unified management of Vsync. In general, a frequency of the Vsync signal is 60 Hz. As illustrated in FIG. 3, assuming that the Vsync signal has a period of T and without considering a transmission delay of the Vsync signal, after a first Vsync signal (Vsync1) arrives at the CPU, the CPU forwards the Vsync1 to each application, and then each application starts to perform a drawing operation in response to touching or sliding operations performed by a user on the display screen. After completing the drawing operation, multiple layers rendered by each application can be obtained. After a second Vsync signal (Vsync2) arrives at the CPU, the CPU forwards the Vsync2 to the layer synthesis module, and the layer synthesis module starts to synthesize the multiple layers rendered by each application to generate a picture to-be-displayed. After a third Vsync signal (Vsync3) arrives at the CPU, the system starts to perform display refreshing to display the picture to-be-displayed on the display screen. As stated above, the application, the layer synthesis module, and the display screen receive Vsync signals of a same frequency, which is a fixed frequency set in advance.

In the process of layer rendering, layer synthesizing, and display refreshing of the terminal, there are three frame rates: a frame rate of rendering, a synthesizing frame rate, and a refresh rate.

The frame rate of rendering refers to a frame rate at which the layer synthesis module is triggered to synthesize layers after the layers are rendered, that is, the number of layers rendered per unit time (such as, 1 second). The frame rate of rendering includes a frame rate of rendering of the application and a frame rate of rendering of the layer. Generally, multiple applications may run in the system and each application may include multiple layers rendered. For example, a video playing application may include three layers: one layer for displaying video content, which can be defined as U1, and two layers of SurfaceView type, where one is for displaying bullet-screen content, which can be defined as U2, and the other is for displaying user interface (UI) controls (such as a play progress bar, a volume control bar, a variety of control buttons, and so on) and advertisements, which can be defined as U3. The bullet-screen is an emerging new feature on online video sites in China and Japan, which allows real-time comments from viewers to fly across the screen like bullets. The frame rate of rendering of the application referred to herein represents the number of times the drawing operation is performed by the application per unit time. In general, at least one layer may be rendered with one drawing operation performed. The frame rate of rendering of the layer referred to herein represents the number of times the rendering of layers with a same number or name (such as U1, U2, or U3 described above) is triggered per unit time. In implementations of the disclosure, the frame rate of rendering of the layer may be optimized.

The synthesizing frame rate refers to a frame rate at which the layers rendered by the multiple applications are synthesized into a picture to-be-displayed. In other words, the synthesizing frame rate is the number of frames synthesized per unit time.

The refresh rate refers to a frame rate at which pictures on the display screen of the terminal are refreshed. Generally, the pictures on the display screen will be refreshed at a refresh rate of 60 Hz.

In one example, in implementations of the disclosure, the term "type" in the expression of "specified type" may refer to an identification (such as number or name) of the layer. For example, U1, U2, and U3 mentioned above represent three types of layers. Generally, the number of layers of an application and the type and purpose (that is, function) of each layer have been set at development stage, which can be determined according to APK settings. The specified type in implementations of the disclosure can be determined according to a certain application. The specified type may include some or all types of the layers of the application.

In one example, the layer attribute information includes at least one of: whether cache data corresponding to the current layer is empty or not, whether the current layer is in a landscape mode or a portrait mode, an attribute of a visible region of the current layer, an attribute of a transparent region of the current layer, existence of an updated region in the current layer, an attribute of the updated region, and image information. For a layer, cache data corresponding to the layer is stored in a cache for the layer. If all cache data is 0, it indicates that the cache data is empty, and the layer here can be comprehended as a blank layer. The terminal usually displays in a landscape mode or a portrait mode, and accordingly the layer may also be rendered in the landscape mode or the portrait mode. Whether the landscape mode or portrait mode of a layer is matched with that of other layers is determined according to a preset matching rule. For example, if a layer is in the portrait mode, and most other layers or some important layers are in the landscape mode, the layer is determined to be not matched with other layers regarding the landscape mode or portrait mode. For layers with the same name or number, they can be rendered by the application at a certain frame rate of rendering. For a current layer received, the current layer may be compared with a layer previously rendered such as a layer received within a preset time period, to determine existence of an updated region in the current layer. For example, compare gray values corresponding to each coordinate position in two layers to see whether the gray value has changed. There is no restriction on the specific value of the preset time period.

In one implementation, the attribute of the visible region includes at least one of: whether the visible region is empty or not, the number of visible regions, a shape of the visible region, a size of the visible region, and a position of the visible region. For example, after the application renders a layer, cache data corresponding to the layer includes coordinate information of the visible region in the layer. Generally, the visible region has a rectangular shape. When coordinates of four vertices of the rectangle are the same, it can be determined that the current layer is free of visible region. In one implementation, the attribute of the transparent region includes at least one of: the number of transparent regions, a shape of the transparent region, a size of the transparent region, a position of the transparent region, and a position of the transparent region relative to a visible region of another layer. In one implementation, the attribute of the updated region includes at least one of: the number of updated regions, a position of the updated region, a shape of the updated region, a size of the updated region, and an area ratio of the updated region to the display screen. In one implementation, the image information includes at least one of: whether an image is a solid color or not (whether color data is 0 or not), color scale of the image, gray scale of the image, a hue of the image, contrast of the image, brightness of the image, saturation of the image, transparency of the image, and ambiguity of the image.

Multiple layer attributes are given above. The target frame rate of rendering can be determined according to at least one of the multiple layer attributes. In one example, other layer attributes can be combined with the multiple layer attributes to determine the target frame rate of rendering.

In one example, the layer attribute information of the current layer can be obtained by a layer rendering module. In another example, the layer attribute information of the current layer can be obtained from a buffer for the current layer.

At block 102, a target frame rate of rendering is determined according to the layer attribute information of the current layer.

In one example, a correspondence relationship between the layer attribute information of a layer of the specified type and the frame rate of rendering can be set in advance. The target frame rate of rendering can be determined by querying the correspondence relationship according to the layer attribute information of the current layer of the specified type. For example, upon determining according to the layer attribute information that content of the current layer is not important, a lower frame rate of rendering can be determined as the target frame rate of rendering. For another example, upon determining according to the layer attribute information that content of the current layer is important, a higher frame rate of rendering can be determined as the target frame rate of rendering.

For example, the current layer of the specified type is U3. According to the correspondence relationship, a target frame rate of rendering corresponding to the layer attribute information of the current layer (U3) rendered by the application is 55 Hz.

At block 103, the application is controlled to render, according to the target frame rate of rendering, a layer to-be-rendered of the specified type.

In one example, the layer to-be-rendered is a layer that needs to be rendered after the current layer. In one example, the target frame rate of rendering may be a maximum frame rate of rendering for the application rendering layers. The application is controlled to render, according to the target frame rate of rendering, the layer to-be-rendered of the specified type as follows. A frequency of a reference signal (such as the above-described Vsync signal) sent to the application is changed to the target frame rate of rendering. Alternatively, the application may change a response mechanism of layer rendering operations to the reference signal, to limit the maximum frame rate of rendering for the application rendering a layer below the target frame rate of rendering. For example, the application responds (that is, the application renders a layer) to the $(2n+1)^{th}$ signal received, and does not respond (that is, the application does not render a layer) to the $(2n)^{th}$ signal received. For example, every n (e.g. 5) signals can be a set of signals, the application may respond to a signal with a preset number of a first type (e.g. 1, 2, 4, 5) in each set of signals, and may not respond to a signal with a preset number of a second type (e.g. 3).

When the target frame rate of rendering is 50 Hz, the next layer to-be-rendered in U3 is rendered at the frame rate of rendering of 50 Hz. This process can be executed in following two manners. One manner is that a frequency of a Vsync signal sent to the application is changed to 50 Hz. The other manner is assuming that the frequency of the Vsync signal is 60 Hz, and six signals per set, then the application is controlled to render the layer to-be-rendered in U3 in response to five signals with preset numbers of a first type (e.g. 1, 2, 3, 4, and 5) in each set of signals, and the application is controlled not to respond to a signal with a preset number of a second type (e.g. 6).

According to the method for controlling rendering of layers, the layer attribute information of the current layer rendered by the application is obtained, where the current layer has the specified type. The target frame rate of rendering is determined according to the layer attribute information of the current layer. The application is controlled to render, according to the target frame rate of rendering, the layer to-be-rendered of the specified type. With aid of the method, the frame rate of rendering of the layer to-be-rendered of the specified type can be determined according to the layer attributes of the rendered layer of the specified type and therefore, it is possible to control rendering of the layers reasonably.

Figure 4:
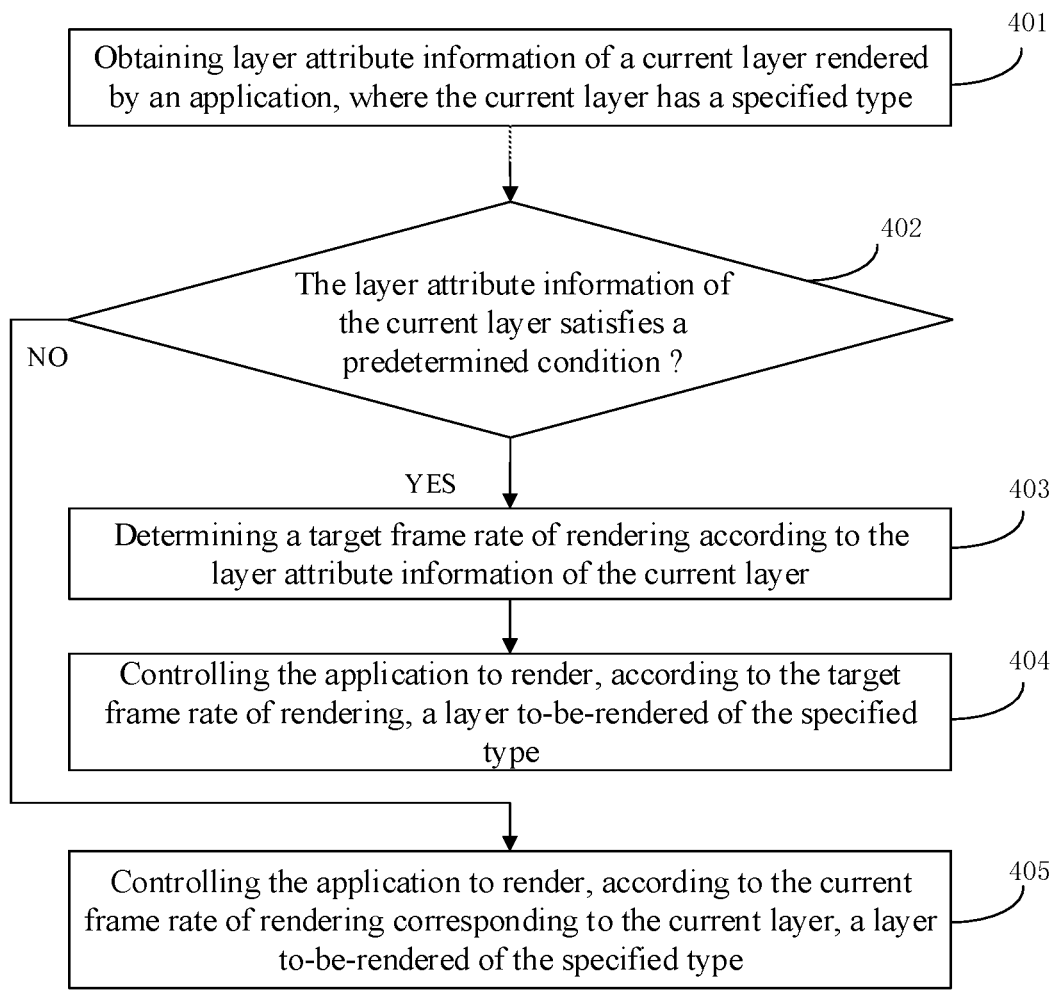
FIG. 4 is a schematic flowchart illustrating a method for controlling rendering of layers according to another implementation of the disclosure.

FIG. 4 is a schematic flowchart illustrating a method for controlling rendering of layers according to another implementation of the disclosure, which can reduce power consumption of a system by reducing a frame rate of rendering. The method begins at block 401.

At block 401, layer attribute information of a current layer rendered by an application is obtained, where the current layer has a specified type.

In one example, the specified type may be a type corresponding to less important display content in the application. For example, when the application is a video playing application, the specified type may be U2 or U3.

At block 402, whether the layer attribute information of the current layer satisfies a predetermined condition is determined, and when the layer attribute information of the current layer satisfies the predetermined condition, proceed to operations at block 403; otherwise, proceed to operations at block 405.

In one example, the predetermined condition may be determined according to display content or purpose of the layer of the specified type. The following describes a video playing application as an example. The predetermined condition may include at least one of the following seven conditions. Condition 1, cache data corresponding to the current layer is empty. Condition 2, a visible region of the current layer is empty. Condition 3, a video picture layer is in a landscape-and-full screen mode and the current layer is in a portrait mode. Condition 4, the video picture layer is in a portrait-and-full screen mode and the current layer is in a landscape mode. Condition 5, the video picture layer is in a full screen mode and a visible region or a transparent region of the current layer has a rectangular shape with a side length equal to that of a screen. Condition 6, the transparent region of the current layer covers a visible region of the video picture layer. Condition 7, there is no updated region in the current layer.

In the above example, the video picture layer is U1, which is used to display videos such as movies, TV series, or programs being played by the video playing application.

The following describes the above-described predetermined conditions in detail.

For condition 1, when U2 or U3 is triggered to be updated, APP will perform a layer rendering operation. However, a resulting cache data may be 0, that is, U2 or U3 has no content to be displayed and therefore is a blank layer. In this case, the frame rate of rendering may be reduced.

For condition 2, when the visible region of U2 or U3 is empty, it indicates that coordinate information of the visible region corresponds to a point rather than a region. Therefore, no content needs to be displayed, and the frame rate of rendering may be reduced.

For conditions 3 and 4, in general, U2 or U3 should display in the same mode (landscape mode or portrait mode) as U1. Otherwise, the picture displayed may be disordered, for example, a display direction of a bullet-screen, advertisements, or UI controls may be different from that of the video playing picture. In this situation, the frame rate of rendering may be reduced, so that the application can handle exceptions in time.

For condition 5, UI is in the full screen mode, and the visible region or the transparent region of U2 or U3 has a rectangular shape with the side length equal to that of the screen. In this case, one visible region or one transparent region is included. According to such configuration, UI controls will not be considered as satisfying condition 5. The reason is that, UI controls that need to be displayed during video playing usually consist of multiple visible regions, but they still need to be retained. Instead, the advertisement or bullet-screen generally has a simple rectangular shape. When the rectangle has a length or width equal to that of the screen, the advertisement or bullet-screen may occlude a large part of the video playing picture. In this case, the frame rate of rendering may be reduced, so that the application can handle exceptions in time.

Figure 5:
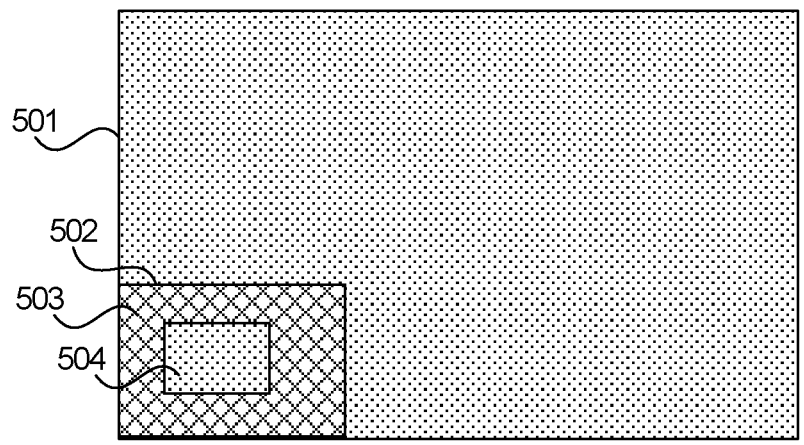
FIG. 5 is a schematic diagram illustrating superimposed layers according to another implementation of the disclosure.

For condition 6, FIG. 5 is a schematic diagram illustrating superimposed layers according to another implementation of the disclosure. As illustrated in FIG. 5, a first layer 501 (all visible) is superimposed with a second layer 502. The second layer 502 includes a visible region 503 and a transparent region 504, where the transparent region 504 reveals a part of contents of the first layer 501. In case the first layer 501 is U1 and the second layer 502 is U2 or U3, if the transparent region of U2 or U3 covers a visible region of U1, this superposition method is generally unreasonable. In this case, the frame rate of rendering may be reduced, so that the application can handle exceptions in time.

For condition 7, when there is no updated region in U2 or U3 within a preset time period (e.g. 16 ms), that is, no change occurs to contents of U2 or U3 and the user does not need to view the content of U2 or U3 anymore. In this case, the frame rate of rendering may be reduced.

At block 403, the target frame rate of rendering is determined according to the layer attribute information of the current layer.

In one implementation, the target frame rate of rendering is lower than a current frame rate of rendering corresponding to the current layer.

When the layer attribute information of the current layer (U2 or U3) satisfies the above predetermined condition, it indicates that U2 or U3 contributes less to a final displayed picture. Therefore, the frame rate of rendering may be reduced to decrease a speed of layer rendering. In addition, it is also possible to reduce the number of layers needed to be synthesized by the layer synthesis module, thereby improving display efficiency and reducing power consumption of the terminal.

At block 404, the application is controlled to render, according to the target frame rate of rendering, a layer to-be-rendered of the specified type.

At block 405, the application is controlled to render, according to the current frame rate of rendering corresponding to the current layer, a layer to-be-rendered of the specified type.

According to the method for controlling rendering of layers, when the layer attribute information of the rendered layer of the specified type satisfies the predetermined condition, the target frame rate of rendering lower than the current frame rate of rendering may be determined according to the layer attribute information of the layer rendered, and the layer to-be-rendered of the specified type may be rendered according to the target frame rate of rendering. In this way, it is possible to reasonably control layer rendering, thereby improving display efficiency and reducing power consumption of the terminal.

In one implementation, the specified type may be indicative of displaying advertisement content and other content (such as user interface controls), corresponding to U3 given above. The predetermined condition may further include: the video picture layer is in a landscape mode, and an updated region of the current layer has a preset shape and an area ratio of the updated region to the screen is less than a preset ratio. In one example, the preset ratio may be determined according to an actual situation, for example, may be ⅓. In this case, only one updated region is included. In general, the updated region has a rectangular shape. Whether the current layer only includes advertisements may be determined according to the predetermined condition. When the current layer only includes the advertisements, the frame rate of rendering may be reduced, thereby improving the display efficiency and reducing power consumption of the terminal.

In one implementation, in parallel to controlling the application to render, according to the target frame rate of rendering, the layer to-be-rendered with the specified type, the method may further include: reducing screen brightness; reducing a screen refresh rate; reducing resolution of the layer to-be-rendered; decreasing play volume. In this way, it is possible to reduce power consumption of the system.

In one example, the brightness of the screen can be reduced by decreasing a brightness value of the display screen, which includes minimizing the brightness value of the display screen (equivalent to screen-off). The screen refresh rate may be reduced by reducing a frequency of the reference signal (such as a Vsync signal) for screen refreshing. Alternatively, the screen refresh rate may be reduced by changing a response mechanism of a screen refreshing operation to the reference signal. The resolution can be reduced in the process of rendering the layer to-be-rendered with related methods of image processing.

Figure 6:
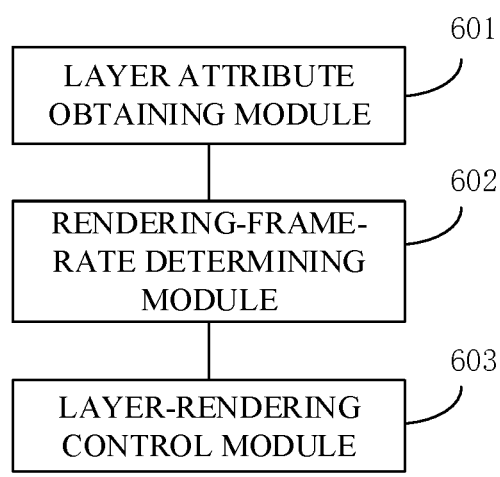
FIG. 6 is a schematic structural diagram illustrating an apparatus for controlling rendering of layers according to an implementation of the disclosure.

FIG. 6 is a schematic structural diagram illustrating an apparatus for controlling rendering of layers according to an implementation of the disclosure. The apparatus can be implemented by software and/or hardware and can generally be integrated into the terminal. The rendering of layers can be controlled by performing a method for controlling rendering of layers. As illustrated in FIG. 6, the apparatus includes a layer attribute obtaining module 601, a rendering-frame-rate determining module 602, and a layer-rendering control module 603. The layer attribute obtaining module 601 is configured to obtain layer attribute information of a current layer rendered by an application, where the current layer has a specified type. The rendering-frame-rate determining module 602 is configured to determine a target frame rate of rendering according to the layer attribute information of the current layer. The layer-rendering control module 603 is configured to control the application to render, according to the target frame rate of rendering, a layer to-be-rendered of the specified type.

According to the apparatus for controlling rendering of layers, the frame rate of rendering of the layer to-be-rendered of the specified type can be determined according to the layer attribute information of rendered layers of the specified type, so that the layers can be reasonably rendered.

In one implementation, the layer attribute information includes at least one of: whether cache data corresponding to the current layer is empty or not, whether the current layer is in a landscape mode or a portrait mode, an attribute of a visible region of the current layer, an attribute of a transparent region of the current layer, existence of an updated region in the current layer, an attribute of the updated region, and image information.

In one implementation, the attribute of the visible region include at least one of : whether the visible region is empty or not, the number of visible regions, a shape of the visible region, a size of the visible region, and a position of the visible region. The attribute of the transparent region include at least one of: the number of transparent regions, a shape of the transparent regions, a size of the transparent region, a position of the transparent region, and a position of the transparent region relative to a visible region of another layer. The attribute of the updated region include at least one of: the number of updated regions, a position of the updated region, a shape of the updated region, a size of the updated region, and an area ratio of the updated region to a screen. The image information includes at least one of: whether an image is a solid color or not, color scale of the image, gray scale of the image, a hue of the image, contrast of the image, brightness of the image, saturation of the image, transparency of the image, and ambiguity of the image.

In one implementation, the rendering-frame-rate determining module 602 is configured to: determine the target frame rate of rendering when the layer attribute information of the current layer satisfies a predetermined condition, where the target frame rate of rendering is lower than a current frame rate of rendering corresponding to the current layer.

In one implementation, the application includes a video playing application. The predetermined condition includes at least one of: cache data corresponding to the current layer is empty, a visible region of the current layer is empty, a video picture layer is in a landscape-and-full screen mode and the current layer is in a portrait mode, the video picture layer is in a portrait-and-full screen mode and the current layer is in a landscape mode, the video picture layer is in a full screen mode and a visible region or a transparent region of the current layer has a rectangular shape with a side length equal to that of a screen, the transparent region of the current layer covers a visible region of the video picture layer, and there is no updated region in the current layer.

In one implementation, the specified type is indicative of displaying advertisement content and other content. The predetermined condition further includes: the video picture layer is in a landscape mode, and an updated region of the current layer has a preset shape and an area ratio of the updated region to the screen is less than a preset ratio.

In one implementation, the apparatus further includes a control module. The control module is configured to: in parallel to that the layer-rendering control module controls the application to render, according to the target frame rate of rendering, the layer to-be-rendered of the specified type: reduce screen brightness; reduce a screen refresh rate; reduce resolution of the layer to-be-rendered; or decrease play volume.

Figure 7:
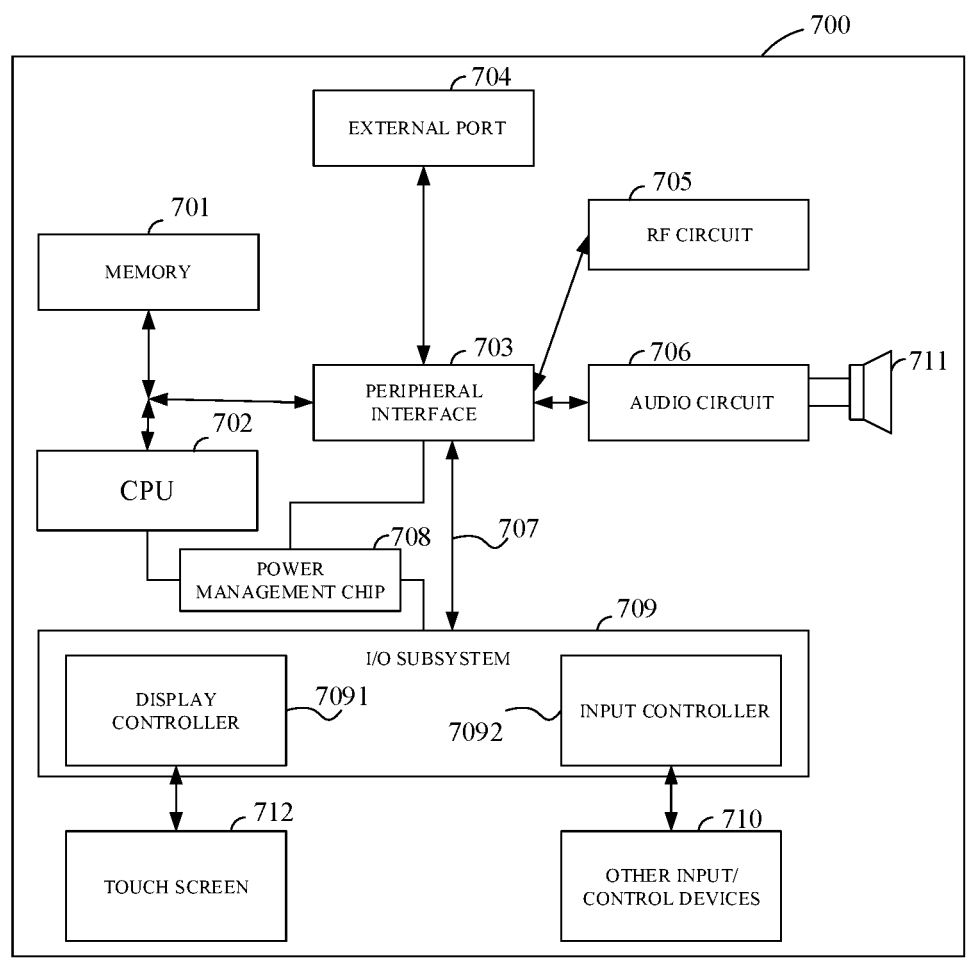
FIG. 7 is a schematic structural diagram illustrating a terminal according to an implementation of the disclosure.

In implementations of the disclosure, a terminal is provided. The apparatus for controlling rendering of layers can be integrated into the terminal. FIG. 7 is a schematic structural diagram illustrating a terminal 700 according to an implementation of the disclosure. As illustrated in FIG. 7, the terminal 700 includes a casing (not illustrated), a memory 701, and a central processing unit (CPU) 702 (also referred as a processor, referred as CPU hereinafter), a circuit board (not illustrated), and a power supply circuit (not illustrated). The circuit board is disposed inside a space defined by the casing. The CPU 702 and the memory 701 are disposed on the circuit board. The power supply circuit is configured to supply power to each circuit or component of the terminal 700. The memory 701 is configured to store executable program codes. The CPU 702 is configured to run a computer program corresponding to the executable program codes by reading out the executable program codes stored in the memory 701 to carry out the following operations. Layer attribute information of a current layer rendered by an application is obtained, where the current layer has a specified type. A target frame rate of rendering is determined according to the layer attribute information of the current layer. The application is controlled to render, according to the target frame rate of rendering, a layer to-be-rendered of the specified type.

The terminal 700 further includes a peripheral interface 703, a radio frequency (RF) circuit 705, an audio circuit 706, a speaker 711, a power management chip 708, an input/output (I/O) subsystem 709, other input/control devices 710, a touch screen 712, and an external port 704, which are communicated via one or more communication buses or signal lines 707.

It should be understood that the terminal 700 illustrated is merely an example and may have more or fewer components than those illustrated. For example, two or more components may be combined, or different component configurations can be adopted in the terminal. The various components illustrated can be implemented in hardware, software, or a combination of hardware and software including one or more signal processing and/or application specific integrated circuits.

The following will describe a terminal for controlling rendering of layers in detail, and a mobile phone will be taken as an example.

The memory 701 can be accessed by the CPU 702, the peripheral interface 703 and so on. The memory 701 may include a high-speed random access memory and may further include a non-transitory memory such as one or more magnetic disk storage devices, flash memory devices, or other volatile solid-state memory devices.

The peripheral interface 703 is configured to connect the input and output peripherals of the apparatus to the CPU 702 and the memory 701.

The I/O subsystem 709 can be configured to connect the input and the output peripherals, such as the touch screen 712 and other input/control devices 710, to the peripheral interface 703. The I/O subsystem 709 may include a display controller 7091 and one or more input controllers 7092 configured to control other input/control devices 710. One or more input controllers 7092 are configured to receive electrical signals from or send electrical signals to other input/control devices 710, where other input/control devices 710 may include a physical button (a press button, a rocker button, etc.), a dial, a slide switch, a joystick, or a click wheel. It should be noted that the input controller 7092 can be coupled with any of a keyboard, an infrared port, a USB interface, and a pointing apparatus such as a mouse.

The touch screen 712 is an input interface and an output interface between the terminal and a user, and is configured to display a visual output to the user. The visual output may include graphics, text, icons, videos, and the like.

The display controller 7091 in the I/O subsystem 709 is configured to receive an electrical signal from or send an electrical signal to the touch screen 712. The touch screen 712 is configured to detect contact on the touch screen, and the display controller 7091 is configured to convert the contact detected into an interaction with a user interface object displayed on the touch screen 712, that is, to realize human-computer interaction. The user interface object displayed on the touch screen 712 may be an icon of a running game, an icon indicating connection to corresponding networks, and the like. It should be noted that the device may also include a light mouse, which is a touch sensitive surface that does not display a visual output, or can be an extension of a touch sensitive surface formed by the touch screen.

The RF circuit 705 is configured to establish communication between a mobile phone and the wireless network (i.e. network side) to achieve data reception and transmission between the mobile phone and the wireless network, for example, reception and transmission of short messages, emails, and the like. The RF circuit 705 is configured to receive and transmit RF signals (which is also known as electromagnetic signals), to convert an electrical signal into an electromagnetic signal or convert an electromagnetic signal into an electrical signal, and to communicate with a communication network and other devices through the electromagnetic signal. The RF circuit 705 may include known circuits for performing these functions, and the known circuits include but are not limited to an antenna system, an RF transceiver, one or more amplifiers, a tuner, one or more oscillators, a digital signal processor, a coder-decoder (codec) chipset, a subscriber identity module (SIM), and so on.

The audio circuit 706 is configured to receive audio data from the peripheral interface 703, to convert the audio data into an electrical signal, and to transmit the electric signal to the speaker 711.

The speaker 711 is configured to restore the voice signal received by the mobile phone from the wireless network via the RF circuit 705 to sound and to play the sound to the user.

The power management chip 708 is configured for power supply and power management of the hardware connected to the CPU 702, the I/O subsystem 709, and the peripheral interfaces 703.

In an implementation of the disclosure, the processor is configured to perform all or part of the operations of any of the methods described in the foregoing method implementations.

With aid of the terminal provided herein, the frame rate of rendering of the layer to-be-rendered of the specified type can be determined according to the layer attribute information of rendered layers of the specified type, so that the layers can be reasonably rendered.

The apparatus for controlling rendering of layers, and the terminal in the above implementation can perform any of the method for controlling rendering of layers according to the implementations of the disclosure, and have the corresponding functional modules and beneficial effects to execute the method. For the technical details not described in detail in the above implementations, reference may be made to the method for controlling rendering of layers in the foregoing implementations.

In implementations of the disclosure, a non-transitory computer readable storage medium is provided. The computer readable storage medium includes instructions which, when executed, are operable with a processor to: obtain layer attribute information of a current layer rendered by an application, wherein the current layer has a specified type; determine a target frame rate of rendering according to the layer attribute information of the current layer when the layer attribute information of the current layer satisfies a predetermined condition; control the application to render, according to the target frame rate of rendering, a layer to-be-rendered of the specified type.

In one implementation, the executable instructions are further operable with the processor to pre-store a correspondence relationship between layer attribute information of the layer of the specified type and a frame rate of rendering. In one implementation, the computer instructions operable with the processor to determine the target frame rate of rendering according to the layer attribute information of the current layer are operable with the processor to: determine the target frame rate of rendering by querying the correspondence relationship according to the layer attribute information of the current layer of the specified type, when the layer attribute information of the current layer satisfies the predetermined condition, wherein the target frame rate of rendering is lower than a current frame rate of rendering corresponding to the current layer.

In one implementation, the executable instructions are further operable with the processor to: control the application to render, according to a current frame rate of rendering corresponding to the current layer, a layer to-be-rendered of the specified type when the layer attribute information of the current layer does not satisfy the predetermined condition.

In implementations of the disclosure, a computer program product is provided. The computer program product includes computer programs stored in a non-transitory computer readable storage medium. The computer program includes program instructions which, when executed, are operable with a computer to perform any of the methods for controlling rendering of layers.

According to the implementations of the disclosure, a method for controlling rendering of layers, a terminal, and a storage medium are provided, which can determine the frame rate of rendering of the layer to-be-rendered of the specified type according to the layer attribute information of rendered layer of the specified type, such that the rendering of the layer may be reasonably controlled.

What is claimed is:

1. A method for controlling rendering of layers, comprising:
   pre-storing a correspondence relationship between layer attribute information of a layer of a specified type and a frame rate of rendering;
   obtaining the layer attribute information of a current layer rendered by an application, wherein the current layer has the specified type, wherein the application comprises a video playing application, and the specified type is indicative of displaying advertisement content or user interface controls;
   determining a target frame rate of rendering according to the layer attribute information of the current layer, comprising:
      when the layer attribute information of the current layer satisfies a predetermined condition, determining the target frame rate of rendering by querying the correspondence relationship according to the layer attribute information of the current layer of the specified type, wherein the target frame rate of rendering is lower than a current frame rate of rending corresponding to the current layer;
   controlling the application to render, according to the target frame rate of rendering, a layer to-be-rendered of the specified type; and
   in parallel with controlling the application to render, according to the target frame rate of rendering, the layer-to-be-rendered of the specified type, at least one of reducing screen brightness, reducing resolution of the layer to-be-rendered, or decreasing play volume,
   wherein the predetermined condition comprises the video picture layer in a landscape mode, an updated region of the current layer has a preset shape, an area ratio of the updated region is less than a preset ratio, and at least one of:
      cache data corresponding to the current layer is empty, a visible region of the current layer is empty, a video picture layer is in a landscape-and-full screen mode and the current layer is in a portrait mode, the video picture layer is in a portrait-and-full screen mode and the current layer is in a landscape mode, the video picture layer is in a full screen mode and a visible region or a transparent region of the current layer has a rectangular shape with a side length equal to that of a screen, the transparent region of the current layer covers a visible region of the video picture layer, or there is no updated region in the current layer.

2. The method of claim 1, wherein the layer attribute information comprises at least one of: whether cache data corresponding to the current layer is empty or not, whether the current layer is in a landscape mode or a portrait mode, an attribute of a visible region of the current layer, an attribute of a transparent region of the current layer, existence of an updated region in the current layer, an attribute of the updated region, or image information.

3. The method of claim 2, wherein
   the attribute of the visible region comprises at least one of:
      whether the visible region is empty or not, the number of visible regions, a shape of the visible region, a size of the visible region, or a position of the visible region;
   the attribute of the transparent region comprises at least one of:
      the number of transparent regions, a shape of the transparent region, a size of the transparent region, a position of the transparent region, or a position of the transparent region relative to a visible region of another layer;
   the attribute of the updated region comprises at least one of:
      the number of updated regions, a position of the updated region, a shape of the updated region, a size of the updated region, or an area ratio of the updated region to a screen; and
   the image information comprises at least one of:
      whether an image is a solid color or not, color scale of the image, gray scale of the image, a hue of the image, contrast of the image, brightness of the image, saturation of the image, transparency of the image, or ambiguity of the image.

4. The method of claim 1, wherein determining the target frame rate of rendering according to the layer attribute information of the current layer comprises:
   determining a current frame rate of rendering corresponding to the current layer as the target frame rate of rendering when the layer attribute information of the current layer does not satisfy the predetermined condition.

5. The method of claim 1, wherein the layer attribute information of the current layer is obtained by a layer rendering module or from a buffer for the current layer.

6. A terminal, comprising:
   a processor; and
   a memory, configured to store computer programs, the computer programs, when executed, being operable with the processor to:
      pre-store a correspondence relationship between layer attribute information of a layer of a specified type and a frame rate of rendering;
      obtain the layer attribute information of a current layer of the specified type rendered by an application, wherein the application comprises a video playing application, and wherein the specified type is indicative of displaying advertisement content or user interface controls;

determine a target frame rate of rendering according to the layer attribute information of the current layer, comprising:
  when the layer attribute information of the current layer satisfies a predetermined condition, determine the target frame rate of rendering by querying the correspondence relationship according to the layer attribute information of the current layer, wherein the target frame rate of rendering is lower than a current frame rate of rendering corresponding to the current layer;
control the application to render, according to the target frame rate of rendering, a layer to-be-rendered of the specified type; and
in parallel with control the application to render, according to the target frame rate of rendering, the layer-to-be-rendered of the specified type, at least one of reduce screen brightness, reduce resolution of the layer to-be-rendered, or decrease play volume;
wherein the predetermined condition comprises the video picture layer is in a landscape mode, an updated region of the current layer has a preset shape, an area ratio of the updated region to the screen is less than a preset ratio, and at least one of: cache data corresponding to the current layer is empty, a visible region of the current layer is empty, a video picture layer is in a landscape-and-full screen mode and the current layer is in a portrait mode, the video picture layer is in a portrait-and-full screen mode and the current layer is in a landscape mode, the video picture layer is in a full screen mode and a visible region or a transparent region of the current layer has a rectangular shape with a side length equal to that of a screen, the transparent region of the current layer covers a visible region of the video picture layer, or there is no updated region in the current layer.

7. The terminal of claim 6, wherein the layer attribute information comprises at least one of: whether cache data corresponding to the current layer is empty or not, whether the current layer is in a landscape mode or a portrait mode, an attribute of a visible region of the current layer, an attribute of a transparent region of the current layer, existence of an updated region in the current layer, an attribute of the updated region, or image information.

8. The terminal of claim 7, wherein
the attribute of the visible region comprises at least one of:
  whether the visible region is empty or not, the number of visible regions, a shape of the visible region, a size of the visible region, or a position of the visible region;
the attribute of the transparent region comprises at least one of:
  the number of transparent regions, a shape of the transparent region, a size of the transparent region, a position of the transparent region, or a position of the transparent region relative to a visible region of another layer;
the attribute of the updated region comprises at least one of:
  the number of updated regions, a position of the updated region, a shape of the updated region, a size of the updated region, or an area ratio of the updated region to a screen; and
the image information comprises at least one of:
  whether an image is a solid color or not, color scale of the image, gray scale of the image, a hue of the image, contrast of the image, brightness of the image, saturation of the image, transparency of the image, or ambiguity of the image.

9. The terminal of claim 6, wherein the computer programs operable with the processor to determine the target frame rate of rendering according to the layer attribute information of the current layer are operable with the processor to:
  determine a current frame rate of rendering corresponding to the current layer as the target frame rate of rendering when the layer attribute information of the current layer does not satisfy the predetermined condition.

10. A non-transitory computer readable storage medium, being configured to store executable instructions which, when executed, are operable with a processor to:
  pre-store a correspondence relationship between layer attribute information of a layer of a specified type and a frame rate of rendering;
  obtain the layer attribute information of a current layer rendered by an application, wherein the current layer has the specified type, wherein the application comprises a video playing application, and wherein the specified type is indicative of displaying advertisement content or user interface controls;
  determine a target frame rate of rendering by querying the correspondence relationship according to the layer attribute information of the current layer of the specified type when the layer attribute information of the current layer satisfies a predetermined condition, wherein the target frame rate of rendering is lower than a current frame rate of rendering corresponding to the current layer;
  control the application to render, according to the target frame rate of rendering, a layer to-be-rendered of the specified type; and
  in parallel with control the application to render, according to the target frame rate of rendering, the layer-to-be-rendered of the specified type, at least one of reduce screen brightness, reduce resolution of the layer to-be-rendered, or decrease play volume;
  wherein the predetermined condition comprises the video picture layer in a landscape mode, an updated region of the current layer has a preset shape, an area ratio of the updated region to the screen is less than a preset ratio, and at least one of:
    cache data corresponding to the current layer is empty, a visible region of the current layer is empty, a video picture layer is in a landscape-and-full screen mode and the current layer is in a portrait mode, the video picture layer is in a portrait-and-full screen mode and the current layer is in a landscape mode, the video picture layer is in a full screen mode and a visible region or a transparent region of the current layer has a rectangular shape with a side length equal to that of a screen, the transparent region of the current layer covers a visible region of the video picture layer, or there is no updated region in the current layer.

11. The non-transitory computer readable storage medium of claim 10, wherein the executable instructions are further operable with the processor to:
  control the application to render, according to a current frame rate of rendering corresponding to the current layer, a layer to-be-rendered of the specified type when the layer attribute information of the current layer does not satisfy the predetermined condition.

* * * * *